(12) United States Patent
Fu et al.

(10) Patent No.: US 12,490,755 B2
(45) Date of Patent: *Dec. 9, 2025

(54) SOLUBLE COFFEE POWDER

(71) Applicant: SOCIETE DES PRODUITS NESTLE S.A., Vevey (CH)

(72) Inventors: Xiaoping Fu, Dublin, OH (US); Daniel Paul Donhowe, Dublin, OH (US); Julien Dupas, Savigny (CH); Adrian Page, Surrey (GB); Jorg Huschka, Giffers (CH); Michael Edwin Mullaney, Raymond, OH (US); John David Wood, Delaware, OH (US)

(73) Assignee: Societe des Produits Nestle S.A., Vevey (CH)

( * ) Notice: Subject to any disclaimer, the term of this patent is extended or adjusted under 35 U.S.C. 154(b) by 501 days.

This patent is subject to a terminal disclaimer.

(21) Appl. No.: 17/905,365

(22) PCT Filed: Mar. 5, 2021

(86) PCT No.: PCT/EP2021/055588
§ 371 (c)(1),
(2) Date: Aug. 31, 2022

(87) PCT Pub. No.: WO2021/180584
PCT Pub. Date: Sep. 16, 2021

(65) Prior Publication Data
US 2023/0089743 A1 Mar. 23, 2023

Related U.S. Application Data

(60) Provisional application No. 62/987,514, filed on Mar. 10, 2020.

(30) Foreign Application Priority Data
Apr. 3, 2020 (EP) .................................. 20167986

(51) Int. Cl.
*A23F 5/32* (2006.01)
*A23F 5/38* (2006.01)

(52) U.S. Cl.
CPC ................ *A23F 5/32* (2013.01); *A23F 5/385* (2013.01)

(58) Field of Classification Search
CPC .................................. A23F 5/32; A23F 5/385
(Continued)

(56) References Cited

U.S. PATENT DOCUMENTS 11,812,761 B2 * 11/2023 Mora ....................... A23F 5/32

FOREIGN PATENT DOCUMENTS

DE 1811669 6/1970
EP 0256567 2/1988
(Continued)

OTHER PUBLICATIONS

Japanese Office Action for Appl No. 2022-553134 dated Dec. 24, 2024, 3 pages.

*Primary Examiner* — Subbalakshmi Prakash
(74) *Attorney, Agent, or Firm* — K&L Gates LLP (57) ABSTRACT

The present invention relates to a soluble beverage powder comprising dried coffee extract particles having two essentially flat surfaces and a uniform thickness. A further aspect of the invention is a process for making a freeze-dried soluble beverage powder.

7 Claims, 3 Drawing Sheets

(58) Field of Classification Search
USPC .......................................................... 426/594
See application file for complete search history.

(56) References Cited

FOREIGN PATENT DOCUMENTS

| | | |
|---|---|---|
| GB | 2119625 | 11/1983 |
| JP | S6317659 A | 1/1988 |
| WO | 2020161068 | 8/2020 |

* cited by examiner

SOLUBLE COFFEE POWDER

CROSS REFERENCE TO RELATED APPLICATIONS

The present application is a National Stage of International Application No. PCT/EP2021/055588, filed on Mar. 5, 2021, which claims priority to U.S. Provisional Application No. 62/987,514, filed on Mar. 10, 2020, and European Patent Application No. 20167986.7, filed on Apr. 3, 2020, the entire contents of which are being incorporated herein by reference.

FIELD OF THE INVENTION

The present invention relates to a soluble beverage powder comprising dried coffee extract particles having two essentially flat surfaces and a uniform thickness. A further aspect of the invention is a process for making a freeze-dried soluble beverage powder.

BACKGROUND OF THE INVENTION

For many years producers of soluble coffee have sought to improve the acceptance of this type of coffee versus roast and ground coffee. Much effort has gone into optimizing the flavour and aroma of soluble coffee and, due to the success of these technical advances, today some soluble coffees are marketed as premium products.

Premium products are products that the consumers consider to be superior and particularly luxurious.

Advances in the appearance of soluble coffee have however been slower. There is a need for technologies that can deliver a soluble coffee having a premium appearance, for example to accompany a premium taste and aroma and enhance the consumer experience in terms of visual identity. In many countries, regulations require that pure soluble coffee can only consist of coffee. This provides challenges in providing a novel and appealing appearance as for example the inclusion of a coloured pigment would not be permitted.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to".

SUMMARY OF THE INVENTION

An object of the present invention is to improve the state of the art and to provide an improved technical solution to the provision of premium appearance in soluble beverage powders. The object of the present invention is achieved by the subject matter of the independent claims. The dependent claims further develop the idea of the present invention.

Accordingly, the present invention provides in a first aspect a soluble beverage powder comprising dried coffee extract particles having two essentially flat surfaces and a uniform thickness; wherein the particles have a median thickness from 0.1 to 10 mm, a surface roughness measured by profilometry of less than 12 µm and a uniformity index measured by profilometry of greater than 0.6.

In a second aspect, the invention relates to a process for making a freeze-dried soluble beverage powder the process comprising the steps; providing a liquid aqueous beverage composition (1) having a total solids content between 5 and 65%; forming a layer (2) of the liquid aqueous beverage composition between and in contact with two parallel flat surfaces (3a, 3b), the surfaces being separated by a gap of from 0.1 to 10 mm; cooling the liquid aqueous beverage composition layer to below −25° C. to form a frozen beverage composition; and drying the frozen beverage composition.

It has been surprisingly found by the inventors that a liquid aqueous beverage composition can be dried in such a way as to produce a soluble beverage powder with an attractive glossy appearance. The inventors surprisingly found that drying a coffee extract in a process that favours the formation of flat particles with a microstructure of small open pores produces a soluble beverage powder that is lighter in colour. In particular, the higher the proportion of open pores with openings smaller than 4.5 micrometres, the lighter the colour of the beverage particle. Where the beverage is coffee, the hue of the coffee extract coupled with the lighter colour and glossy surface results in an appearance which is similar to that of metallic gold and so is visually attractive. Gold has a distinctive appearance, having both a gold hue and a specular reflection characteristic of polished metals. Gold has been associated with wealth and luxury throughout history.

BRIEF DESCRIPTION OF THE DRAWINGS

FIG. 3 shows electron micrographs of Sample A.

DETAILED DESCRIPTION OF THE INVENTION

Consequently the present invention relates in part to a soluble beverage powder comprising (for example consisting of) dried coffee extract particles having two essentially flat surfaces (for example two flat surfaces) and a uniform thickness; wherein the particles have a median thickness from 0.1 to 10 mm (for example from 0.15 to 5.0 mm, for example from 0.2 to 3.0 mm, for example from 0.2 to 1.5 mm, for further example from 0.25 to 0.5 mm), a surface roughness measured by profilometry of less than 12 µm (for example less than 10 µm, for example less than 8 µm, for further example less than 6 µm) and a uniformity index measured by profilometry of greater than 0.6 (for example greater than 0.7).

In an embodiment, the soluble beverage powder is a freeze-dried soluble beverage powder.

In an embodiment the dried coffee extract particles are freeze-dried coffee extract particles.

The soluble beverage powder may be a coffee mix, for example the soluble beverage powder may be a coffee mix comprising dried coffee extract and milk powder. The soluble beverage powder may be a coffee mix comprising coffee and chicory. The soluble beverage powder may be a flavoured coffee mix, for example caramel or vanilla flavoured. Many food regulations prohibit components other than coffee materials in a pure soluble coffee. The soluble beverage powder may be a pure soluble coffee, for example the soluble beverage powder may consist of dried coffee extract.

The coffee extract according to the invention may be an aqueous coffee extract suitable for further processing into soluble coffee. Roasted coffee beans may be extracted with water to produce a coffee extract. The roasted beans are usually ground before being extracted with water. Grinding of roasted coffee beans are well known in the art and the roasted coffee beans may be ground by any suitable method. Extraction may be performed by any suitable method known in the art. Methods for extracting coffee beans are well known in the art of production of soluble coffee, e.g. from EP0826308, and normally involve several extraction steps at increasing temperature. When the desired degree of extraction has been reached, the extracted roast coffee beans are separated from the extract. The separation may be achieved by any suitable means, e.g. filtration, centrifugation, and/or decanting. In conventional coffee extraction for the production of soluble coffee, the separation is usually achieved by performing the extraction in extraction cells wherein the coffee grounds are retained by filter plates or retainer plates through which the coffee extract can flow. Before and/or during extraction, volatile aroma compounds may be recovered from the coffee beans and/or the extract, e.g. by steam stripping and/or the use of vacuum, to avoid loss of aroma. The recovered volatile compounds may be added back to the extract after extraction.

The coffee extract may be a cold brew coffee, for example roasted coffee extracted at a temperature below 100° C., for example below 80° C., for example below 60° C., for example below 40° C., for further example below 20° C.

The coffee extract may be an extract of roasted *Arabica* coffee beans, *Robusta* coffee beans or combinations of these. Coffee beans are the seeds of the coffee plant (*Coffea*). By *Arabica* coffee beans are meant coffee beans from *Arabica* coffee plants (*Coffea arabica*) and by *Robusta* coffee beans are meant beans from *Robusta* coffee plants (*Coffea canephora*).

The flat surfaces of the coffee extract particles cause them to exhibit a specular reflection of light characteristic of polished metals. In the context of the present invention the term "flat surface" means a level surface without raised areas. The surface roughness may be measured by a wide area 3D profilometer using pattern projection techniques. The surface roughness was characterized with the parameter Sa (Arithmetical mean height of the surface) that is calculated from the map of heights of a particle, using the definition corresponding to that in ISO 25178 [ISO 25178-2:2012, Retrieved from https://www.iso.org/standard/42785.html] and applying the following cut-off wavelength filters: $\lambda_S$=8 μm and $\lambda_L$=0.8 mm. The surface roughness Sa decreases as the surface becomes flatter. For example, the flat surfaces of the particles according to the invention may have a surface roughness measured by profilometry of less than 12 μm.

The thickness of the particles is considered in the direction perpendicular to a flat surface. The thickness may be measured by microscopy. Preferably the thickness may be measured by a wide area 3D profilometer using pattern projection techniques.

The particles according to the invention individually have a uniform thickness such that the uniformity index measured by profilometry is greater than 0.6, for example greater than 0.7. The uniformity index of a particle is calculated from the mean thickness of an individual particle divided by the maximum thickness of the individual particle.

The particles according to the invention may all have similar thicknesses. In an embodiment the particles have an overall uniformity index greater than 0.6, for example greater than 0.7 The overall uniformity index is calculated from the median of mean thickness of all the individual particles T, and the median of maximum thickness of all the individual particles $T_{max}$ according to the equation below.

$$\text{Overall uniformity index} = \frac{T}{T_{max}}$$

In an embodiment the particles have open pores with openings smaller than 4.5 micrometres, the volume of the open pores with openings smaller than 4.5 micrometres being greater than 50% of the total volume of open pores as measured by mercury porosimetry (for example greater than 60%, for example greater than 70%, for example greater than 80%, for further example greater than 90% of the total volume of open pores). Using mercury intrusion measurements, the intrusion achieved under a pressure of 40 psia corresponds to the volume of open pores having openings larger than 4.5 micrometres. The volume of the open pores with openings smaller than 4.5 micrometres may be greater than 0.75 ml/g (for example greater than 0.80 ml/g, for example greater than 0.85 ml/g, for further example greater than 0.90 ml/g) as measured by mercury porosimetry. The volume of the open pores with openings smaller than 4.5 micrometres may be from 0.75 to 2.0 ml/g, for example from 0.80 to 1.50 ml/g, for further example 0.90 to 1.0 ml/g. Open pores in freeze dried materials are typically the result of ice crystals which sublime during the drying process leaving voids or pores. The generation of small ice crystals, for example by rapid freezing, results in small open pores.

In an embodiment the particles have a total open pore volume greater than 0.9 ml/g as measured by mercury porosimetry, for example greater than 0.95 ml/g. The particles may have a total open pore volume from 0.9 to 2.1 ml/g as measured by mercury porosimetry, for example from 0.95 to 1.4 ml/g, for further example from 1.0 to 1.2 ml/g.

In an embodiment the particles have open pores with openings smaller than 2 micrometres, the volume of the open pores with openings smaller than 2 micrometres being greater than 20% of the total volume of open pores as measured by mercury porosity, for example greater than 30%, for example greater than 40%, for example greater than 50%, for further example greater than 60%. The particles may have a volume of open pores with openings smaller than 2 micrometres from 20 and 90% of the total volume of open pores as measured by mercury porosity, for example from 40 to 80%, for further example from 50 to 70%. Using mercury intrusion measurements, the intrusion achieved under a pressure of 90 psia corresponds to the volume of open pores having openings larger than 2 micrometres. The volume of the open pores with openings smaller than 2 micrometres may be greater than 0.5 ml/g (for example greater than 0.6 ml/g, for example greater than 0.7 ml/g, for example greater than 0.7 ml/g) as measured by mercury porosimetry. The volume of the open pores with openings smaller than 2 micrometres may be between 0.5 and 1.2 ml/g as measured by mercury porosimetry, for example between 0.6 and 1.1 ml/g, for further example between 0.7 and 1.0 ml/g.

In an embodiment the particles have open pores with openings smaller than 4.5 micrometres but larger than 2 micrometres, the volume of the open pores with openings smaller than 4.5 micrometres but larger than 2 micrometres being from 5 to 80% of the total volume of open pores as measured by mercury porosity, for example from 10 to 70%, for example from 20 to 60%, for further example from 30 to 50%.

In an embodiment the particles have a median open pore diameter of less than 4.5 micrometres as measured by mercury porosimetry, for example less than 4 micrometres, for example less than 3 micrometres, for example less than 2.5 micrometres, for example less than 2 micrometres, for example less than 1.7 micrometres. The particles may have a median open pore diameter of from 0.3 to 3.5 micrometres as measured by mercury porosimetry, for example from 0.4 to 2.5 micrometres, for further example from 0.5 to 2 micrometres. The median open pore diameter is the volume median diameter Dv50.

The open pores may be needle-shaped. The needle-shaped pores may have a length more than 10 times the mean diameter. "Length" and "diameter" may be measured by microscopy, for example scanning electron microscopy coupled with image analysis.

Polished metals exhibit specular reflection, where incident light is reflected in a single outgoing direction. Specular reflection is sometimes referred to as gloss. In an embodiment the soluble beverage powder has a gloss at 60° geometry of at least 0.25 gloss units, for example at least 0.3 gloss units, for example at least 0.4 gloss units, for example at least 0.5 gloss units, for further example at least 0.6 gloss units. The gloss may for example be measured with illuminant CIE-C and a CIE standard observer. The gloss may be measured using a BYK Gardner Micro-Tri-Gloss Meter, for example fitted with a support adapted to cosmetics powders.

The CIE 1976 L*a*b* (hereinafter CIELAB) colour scale is one method of measuring colour proposed by the Commission Internationale de l'Eclairage (CIE) [CIE Technical Report, Colorimetry $2^{nd}$ Edition, CIE 15.2-1986, corrected reprint 1996]. The CIELAB colour space is produced by plotting the quantities L*, a*, b* in rectangular coordinates. The L* coordinate of an object is the lightness intensity as measured on a scale from 0 (black) to 100 (absolute white). The a* and b* coordinates have no specific numerical limits. The parameter a* runs from pure green (negative a*) to pure red (positive a*), while b* runs from pure blue (negative b*) to pure yellow (positive b*). In the CIELAB colour space, colour difference may be calculated as a single value taking into account the differences between the L*, a* and b* values of two samples. The colour difference rE is calculated as follows:

$$\Delta E = \sqrt{(\Delta L^*)^2 + (\Delta a^*)^2 + (\Delta b^*)^2}$$

In an embodiment the soluble beverage powder has a colour difference $\Delta E$ from gold below 80, for example below 75, for example below 70, for further example below 65. In an embodiment the dried coffee extract particles have a colour difference $\Delta E$ from gold below 80, for example below 75, for example below 70, for further example below 65. In the context of the present invention the colour gold is considered to have CIELAB values L*=86.9, a*=−1.9 and b*=87.1. This corresponds to the hexadecimal gold color code #ffd700 [web document <encycolorpedia.com/ffd700> accessed 30 Jan. 2019]. Therefore, rE from gold is calculated from measured values of L*, a* and b* as follows:

$$\Delta E \text{ from gold} = \sqrt{(L^*-87)^2 + (a^*+2)^2 + (b^*-87)^2}$$

Colour measurement may be performed by a commercial colour meter, such as a HunterLab Colorflex (CX1051) device, for example using the illuminant/observer setting D65/45°±2° with specular reflection excluded.

In an embodiment the soluble beverage powder has a L* value greater than 40, for example a lightness intensity L* value greater than 45 measured by a colour meter such as a HunterLab Colorflex (CX1051) device. In an embodiment the dried coffee extract particles have a L* value greater than 40, for example a lightness intensity L* value greater than 45 measured by a colour meter such as a HunterLab Colorflex (CX1051) device.

The inventors have found that by applying different cooling rates to coffee extract during freezing they can obtain particles which exhibit more than one colour, for example more than one lightness intensity. In an embodiment the particles may be multi-colour, for example bi-colour. The particles may be multi-colour (for example bi-colour) on a single surface. The dried coffee extract particles may be bi-colour on opposing surfaces (e.g. top and bottom), for example the particles may have one essentially flat surface exhibiting an L* value (for example as measured by a HunterLab Colorflex (CX1051) device) at least 1.2 times the L* value of the opposing parallel essentially flat surface, for example at least 1.4 times, for example at least 1.6, for example at least 1.8 times, for further example at least 2 times.

In an embodiment the soluble beverage powder is a glassy amorphous solid, for example a glassy amorphous solid at 20° C. In an embodiment the dried coffee extract particles are glassy amorphous solids, for example glassy amorphous solids at 20° C. A glassy amorphous solid exhibits a glass transition temperature. A glass transition temperature may be for example be measured by differential scanning calorimetry. The soluble beverage powder may be free from crystalline material, for example no crystals may be observed under a microscope using polarized light.

The soluble beverage powder may have a particle size distribution D(4,3) from 0.05 mm to 10 mm, for example from 0.2 mm to 5 mm. The dried coffee extract particles according to the invention may have a particle size distribution D(4,3) from 0.05 mm to 10 mm, for example from 0.2 mm to 5 mm. The particle size distribution D(4,3) may be measured by laser diffraction.

Figure 1:
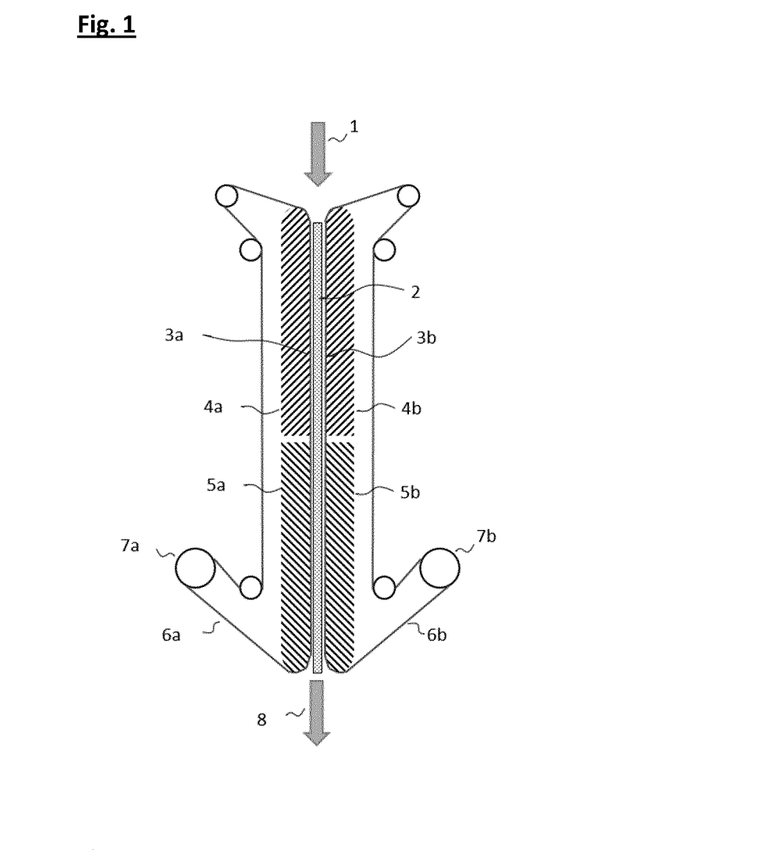
FIG. 1 is a schematic representation of an apparatus used to form and cool a liquid beverage extract between two parallel flat surfaces.

An aspect of the invention provides a process for making a freeze-dried soluble beverage powder the process comprising the steps; providing a liquid aqueous beverage composition (1) having a total solids content between 5 and 65% (for example between 20 and 55%, for example between 30 and 50%); forming a layer (2) of the liquid aqueous beverage composition between and in contact with two parallel flat surfaces (3a, 3b), the surfaces being separated by a gap of from 0.1 to 10 mm (for example between 0.2 and 2.5, 0.3 and 2.0, 0.5 and 1.5 mm); cooling the liquid aqueous beverage composition layer to below −25° C. (for example below −30° C., for example below −35° C., for example below −40° C.) to form a frozen beverage composition; and drying the frozen beverage composition (for example under vacuum). The liquid aqueous beverage composition may for example be cooled by being in contact with the parallel flat surfaces which are chilled (4a, 4b), for example two parallel solid flat surfaces which are chilled. Freezing the aqueous beverage composition between two parallel flat surfaces which are chilled produces a frozen sheet, flat on both sides. An open surface when frozen will have a higher surface roughness. The process of the invention advantageously provides particles of freeze-dried beverage with uniform flat surfaces and a microstructure of open pores providing a distinctive appearance. The liquid aqueous beverage composition may be pre-chilled before being formed as a layer.

Preferably the liquid aqueous beverage composition flows freely as opposed to being a paste. The shear required to distribute a pasty material over a flat surface to form a layer would disrupt the formation of flat particles having a microstructure of small open pores. The liquid aqueous beverage composition may have a viscosity of less than 1500 mPa·s (for example less than 1000 mPa·s) measured at a shear rate of 75 $s^{-1}$ at the temperature immediately before being formed into a layer. For example as measured using an Anton Paar Rheometer.

The liquid aqueous beverage composition may comprise less than 1 wt. % solid ice immediately before being formed into a layer.

The liquid aqueous beverage composition may for example be selected from the group consisting of a dairy beverage, a beverage creamer, a plant-based milk, a plant extract and combinations of these. The plant extract may be for example a tea (aqueous extract of *Camellia sinensis*), a tisane (an aqueous infusion made from leaves, bark, roots, berries, seeds, and spices for example mint, chamomile, verbena, and rooibos), an aqueous extract of coffee berry pulp or husk (cascara), a coffee extract and combinations of these.

In an embodiment the aqueous beverage composition is a coffee extract, for example the frozen beverage composition may be a frozen coffee extract.

In an embodiment the invention provides a process for making a freeze-dried soluble beverage powder the process comprising the steps; providing a liquid coffee extract (1) having a total solids content between 5 and 65% (for example between 20 and 55%, for example between 30 and 50%); forming a layer (2) of the coffee extract between and in contact with two parallel flat surfaces (3a, 3b), the surfaces being separated by a gap of from 0.1 to 10 mm (for example between 0.2 and 2.5, 0.3 and 2.0, 0.5 and 1.5 mm); cooling the coffee extract layer to below −25° C. (for example below −30° C., for example below −35° C., for example below −40° C.) to form a frozen coffee extract; and drying the frozen coffee extract (for example under vacuum). The coffee extract may for example be cooled by being in contact with the parallel flat surfaces which are chilled (4a, 4b). The liquid coffee extract may be pre-chilled before being formed as a layer.

The liquid coffee extract may be an aqueous coffee extract suitable for further processing into soluble coffee.

The solids content of the aqueous beverage composition (for example coffee extract) is the weight of dry matter as a percentage of the total weight of the composition on a wet basis. Various methods are available for increasing the solids content of an aqueous beverage composition (for example coffee extract). For example water may be evaporated under vacuum from the aqueous beverage composition. The evaporation may be performed with aroma capture. Water may be removed via membrane concentration or additional solid beverage composition (for example dried coffee extract) may be dissolved in the aqueous beverage composition (for example aqueous coffee extract). In an embodiment, the aqueous beverage composition is coffee extract, has from 50 wt % to 65 wt % solids and is the result of adding dried pure soluble coffee to an aqueous coffee extract.

The flat surfaces (3a, 3b) in contact with the liquid aqueous beverage composition may have a surface roughness measured by profilometry of less than 12 μm (for example less than 10 μm, for example less than 8 μm, for further example less than 6 μm).

The frozen beverage composition (for example the frozen coffee extract) may be fragmented before drying, for example it may be broken into granules in the frozen state. The dried beverage composition (for example the dried coffee extract) may be fragmented. The beverage composition may be fragmented first in the frozen state and then also in the dried state. In an embodiment the freeze-dried soluble beverage powder may have a particle size D(4,3) from 0.05 mm to 10 mm.

The liquid aqueous beverage composition (for example liquid coffee extract) may be gassed before being formed into a layer, for example gas may be added to the liquid aqueous beverage composition by means of a gas addition line where the gas is slightly above the pressure of the aqueous beverage composition. The aqueous beverage composition may be at above atmospheric pressure when the gas is added such that releasing the pressure leads to the formation of a foam. The liquid aqueous beverage composition may be a foam when formed into a layer. Foaming aqueous beverage compositions before freeze-drying may be used to speed up drying time and to enhance the dissolution properties of the final beverage powder. The gas may be selected from the group consisting of nitrogen, air, argon, nitrous oxide and carbon dioxide. For example the gas may be carbon dioxide. For example the gas may be nitrogen.

In an embodiment the flat surfaces are moving bands (6a, 6b), for example conveying the beverage composition (for example coffee extract) between them. In an embodiment, cooling is applied to at least one moving band, for example cooling may be applied on the reverse surface of the band to that in contact with the beverage composition (for example coffee extract). Cooling may be applied by a cooling plate (4a) on the reverse surface of the band to that in contact with the beverage composition. Cooling (4a, 4b) may be applied to both moving bands. The bands may be controlled such that they move together, for example using a linked drive system (7a, 7b) for the bands. The bands may be formed of any suitable material, for example materials used for conveyor belts in contact with food. The bands may be metal. The bands may be plastic. The bands may have a non-stick surface, for example they may be coated with polytetrafluoroethylene or silicon.

In an embodiment, greater cooling is applied to one moving band than the other, for example so that the two opposing surfaces of beverage composition (for example coffee extract) experience different cooling rates. Faster cooling of the beverage composition (for example coffee extract) results in the generation of smaller ice crystals. The ice crystal size controls the size of the open pores formed after freeze-drying. By creating different sized pores on opposing sides of the freeze dried extract (for example top and bottom flat surfaces), visually attractive bi-colour particles can be produced. Cooling may be applied to a first moving band by a first cooling plate (4a) and to a second moving band by a second cooling plate (4b) positioned directly opposite the first cooling plate, wherein the temperature difference between the first and second cooling plates is at least 5° C., for example at least 10° C.

In an embodiment the bands pass through multiple cooling zones. Multiple cooling zones allow precise control of the beverage composition cooling. For example the first moving band may pass over a further cooling plate (5a) and the second cooling band may pass over a further cooling plate (5b). In an embodiment the moving bands do not pass through a heating zone. The cooling zones progressively cool the liquid aqueous beverage composition.

In an embodiment the moving bands are oriented vertically and the liquid aqueous beverage composition (for example liquid coffee extract) is fed between the bands at the top, travels downwards in contact with the moving bands forming a frozen beverage composition (for example frozen coffee extract) which is discharged (8) from the bottom.

In a further aspect of the invention, the process of the invention described above may be for making the soluble beverage powder of the invention.

Figure 2:
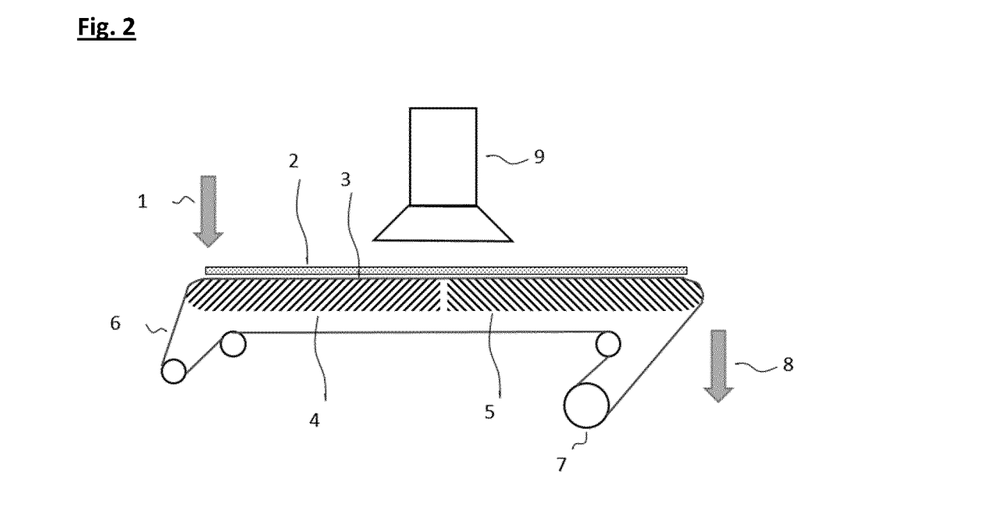
FIG. 2 is a schematic representation of an apparatus used to form and cool a liquid beverage extract in contact with a flat surface.

A still further aspect of the invention provides a process for making the soluble beverage powder of the invention, the process comprising the steps; providing a liquid coffee extract (1) having a total solids content between 5 and 65% (for example between 20 and 55%, for example between 30 and 50%); forming a layer of the coffee extract (2) in contact with a flat surface (3), the coffee extract layer having a thickness from 0.1 to 10 mm (for example between 0.2 and 2.5, 0.3 and 2.0, 0.5 and 1.5 mm); cooling the coffee extract layer to below −25° C. (for example below −30° C., below −35° C., below −40° C.) to form a frozen coffee extract; and drying the frozen coffee extract (for example under vacuum). The coffee extract may for example be cooled by being in contact with a cooled flat surface. The flat surface may for example be a moving band (6), for example conveying the coffee extract. In an embodiment, cooling is applied to the moving band, for example cooling may be applied underneath the band on which the coffee extract is in contact. Cooling may be applied to the band by means of a cooling plate (4, 5). Air cooling (9) may be applied to the layer of coffee extract, for example the layer of coffee extract may be on top of a cooled moving band, leaving an exposed top coffee layer surface to which cooling air is applied.

Those skilled in the art will understand that they can freely combine all features of the present invention disclosed herein. In particular, features described for the product of the present invention may be combined with the process of the present invention and vice versa. Further, features described for different embodiments of the present invention may be combined. Where known equivalents exist to specific features, such equivalents are incorporated as if specifically referred to in this specification.

Further advantages and features of the present invention are apparent from the figures and non-limiting examples.

EXAMPLES

Example 1: Method for Preparation of a Soluble Beverage Powder

Liquid coffee extract having a solids content of 40% dry matter was fed (1) between two moving belts (6a, 6b) in the apparatus shown in FIG. 1. The gap between the two moving belts was set at 1.1 mm. The feed rate of the liquid coffee extract was 100 g/min. The coffee extract temperature was 20° C. The speed of two moving belts was regulated by a linked drive system (7a, 7b) to give a total residence time of coffee liquor in the apparatus of 2 min.

Cooling plates (4a, 4b, 5a, 5b), positioned in contact with the moving belts on the reverse side from the extract, cooled the extract. The first cooling plates (4a, 4b) were both set to 0° C., and the second plates (5a, 5b) to −77° C. The cooling plates were cooled by a recycling liquid coolant. The formation of ice crystals mostly occurs in between the second plates (5a, 5b) forming a solid layer of frozen coffee extract. Since the coffee extract is trapped and frozen between two moving belts, a thin and flat coffee extract sheet was formed after freezing; it had a thickness of 1.07 mm After the frozen coffee ice sheet was discharged (8) from the apparatus, it was collected and ground to a particle size D(4,3) of around 1 mm. The ground frozen coffee extract was then vacuum dried using a typical coffee freeze-drying conditions to form Sample A. The sample was in the form of particles having flat, glossy surfaces.

Further samples were prepared in the same manner except that the cooling temperatures and gap between the belts was altered.

| Sample | Temperature of first zone (plates 4a, 4b) | Temperature of second zone (plates 5a, 5b) | Gap |
|---|---|---|---|
| A | 0° C. | −77° C. | 1.1 mm |
| B | −5° C. | −77° C. | 0.7 mm |
| C | −25° C. | −60° C. | 1.4 mm |

Figure 3A:
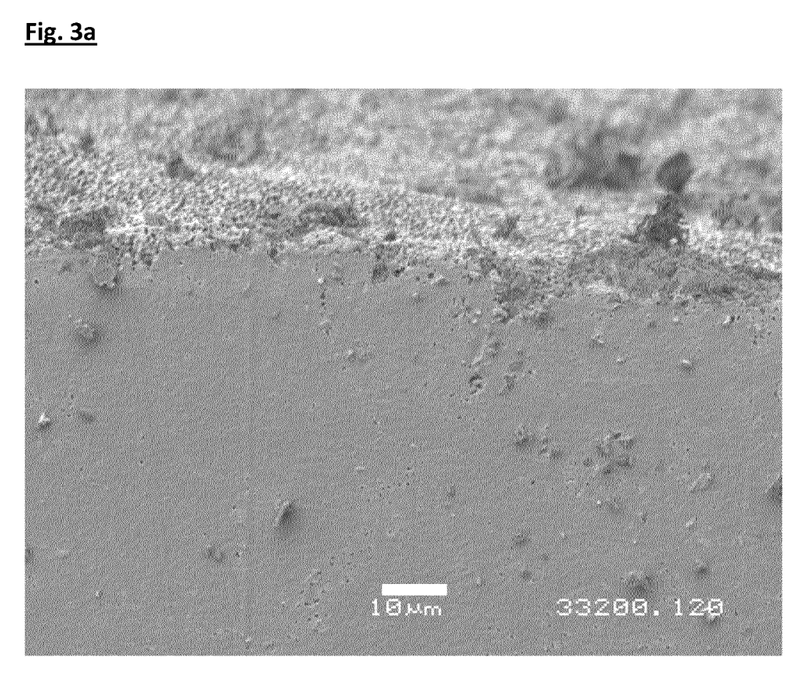
FIG. 3*a* shows a surface morphology of thin film frozen and vacuum dried coffee granule, a flat/smooth surface is obtained, that results in a shiny glossy appearance of coffee granule.
Figure 3B:
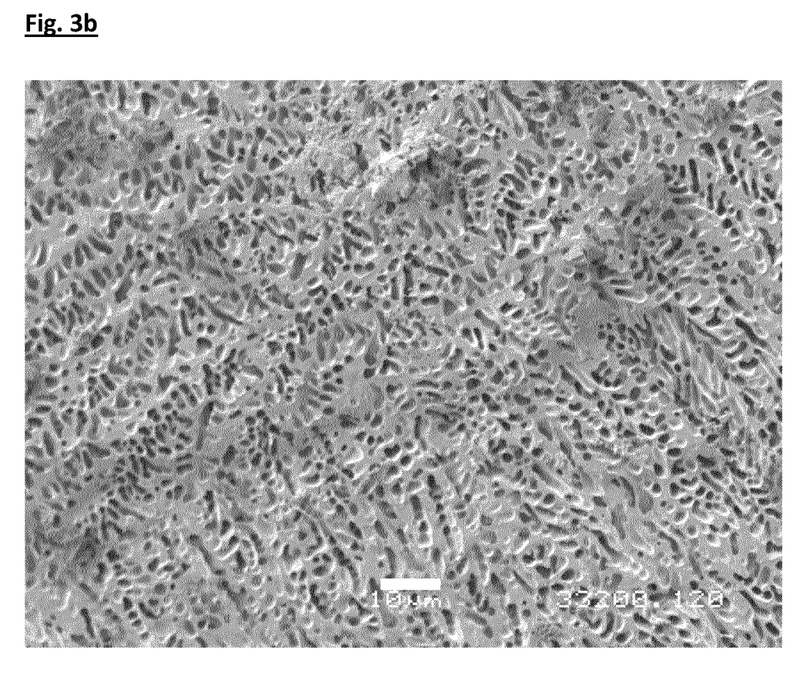
FIG. 3*b* shows the internal structure of the dried granule. The voids were from ice crystal sublimation with many voids having diameters smaller than 4.5 micrometres. The scale bars are 10 micrometres.

Scanning electron microscopy was used to examine the samples. The SEM images for Sample A are shown in FIG. 3. It can be observed that a flat surface is obtained. Small openings are visible.

Example 2: Measuring Surface Profile

The thickness and the topography of the particles was measured with a Keyence VR5200 wide-area 3D profilometer using pattern projection techniques.

The thickness of the particles was measured. At least 100 particles were manually placed onto the black measurement stage of the device which is defined as the reference plan. Particles did not touch each another. Brightness was adjusted at 5 ms, high-magnification camera ×40 was selected and the high-resolution roughness mode was activated. Measurement was then performed, and a map of heights with a pixel size of 3.7 µm obtained. The Volume & Area module allows obtaining statistics on all the individual coffee particles. The median sample thickness T is calculated from the individual particles' mean thicknesses. The median of maximum thickness $T_{max}$ is obtained from the maximum height of all particles.

Surface roughness Sa is calculated from the measured map of heights of a particle using Sa definition from ISO 25178 document and applying the following cut-off wavelength filters: $\lambda_S$=8 µm and $\lambda_L$=0.8 mm. A wide region of interest was manually drawn on each measured particle and the average roughness for multiple particles was reported.

Finally, a uniformity index UI is calculated from the median of the mean particle thickness and the median of maximum particle thickness:

$$\text{Uniformity index} = \frac{T}{T_{max}}$$

This index is close to 1 for very flat particles with uniform thickness.

Results for the samples are listed in the table below. In addition a commercial soluble coffee product with a flat surface (Commercial sample i) was measured for comparison as well as a standard freeze dried coffee (Commercial sample ii).

| Sample | Median thickness (μm) | Surface Roughness (μm) | Uniformity Index |
|---|---|---|---|
| A | 575 | 1.8 | 0.75 |
| B | 450 | 2.5 | 0.71 |
| C | 699 | 4.0 | 0.72 |
| Commercial sample i | 739 | 12.7 | 0.78 |
| Commercial sample ii | 687 | 16.5 | 0.56 |

The samples according to the invention are less rough than either the flat commercial sample i or the standard commercial sample ii.

Example 3: Measuring Pore Structure with Mercury Porosimetry

AutoPore IV 9520 was used for structure evaluation (Micromeritics Inc. Norcrose, Ga., USA). The operation pressure for Hg intrusion was from 0.4 psia to 9000 psia (with low pressure from 0.4 psia to 40 psia and high pressure port from 20 to 9000 psia). The pore diameter under this pressure is ranged from 500 to 0.01 micrometres. The data reported is total pore volume and pore volume (ml/g) at different pore opening diameters (μm). About 0.1 to 0.4 g of sample is precisely weighted and packed in a penetrometer (volume 3.5 ml, neck or capillary stem diameter 0.3 mm and stem volume of 0.5 ml).

After the penetrometer is inserted into the lower pressure port, the sample is evacuated at 1.1 psia/min initially, switching to a medium rate at 0.5 psia and to a fast rate at 900 μm Hg. The evacuating target is 60 μm Hg. After reaching the target, the evacuation is continued for 5 min before Hg is introduced. The measurement is conducted in set-time equilibration. That is, the pressure points at which data are to be taken and the elapsed time at that pressure in the set-time equilibration (10 sec) mode. Roughly, 140 data points are collected at the pressure ranges.

The volume of open pores per gram of product in the diameter range 1 to 500 micrometres gives the "open pore Volume'.

The baseline value is obtained by running the corresponding empty penetrometer under the same operation conditions of pressure for Hg intrusion, from 0.4 psia to 9000 psia without any sample.

Figure 4:
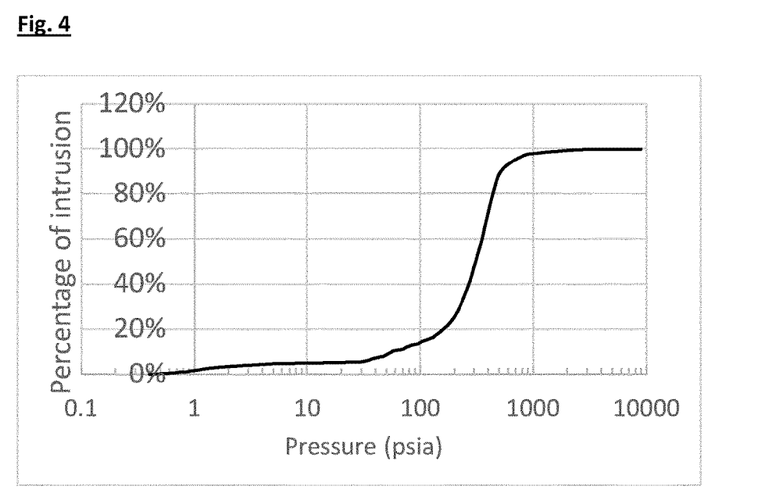
FIG. 4 is a plot of percentage intrusion (Y-axis) vs applied pressure (X-axis) for the mercury intrusion of Sample A.

A plot of percentage intrusion versus pressure for Sample A is shown in FIG. 4.

Results for the samples are listed in the table below.

| Sample | Total open pore volume (ml/g) | % open pore volume <2 μm | % open pore volume <4.5 μm | Median open pore Diameter (Volume) μm |
|---|---|---|---|---|
| A | 1.06 | 86.4 | 92.8 | 0.58 |
| B | 1.01 | 67.8 | 91.5 | 1.52 |
| C | 1.29 | 44.5 | 84.2 | 3.06 |
| Commercial sample i | 1.49 | 14.8 | 28.8 | 11.6 |
| Commercial sample ii | 1.66 | 4.1 | 27.5 | 6.25 |

The samples according to the invention have much higher proportions of open pores with opening smaller than 2 micrometres and with opening smaller than 4.5 micrometres compared to the commercial samples. The samples according to the invention also have a much smaller median open pore diameter than the commercial samples.

Example 4: Colour and Appearance

The colour of the samples was measured using a HunterLab Colorflex (CX1051) device, with illuminant/observer setting D65/45°±2° and a 47 mm sample holder The colour difference rE from gold was calculated from measured values (three repeats) of L*, a* and b* as follows:

$$\Delta E \text{ from gold} = \sqrt{(L^*-87)^2+(a^*+2)^2+(b^*-87)^2}$$

The specular reflection of the samples was measured using a BYK Gardner Micro-Tri-Gloss Meter fitted with a support adapted to cosmetics powders. Gloss was measured with 60° incident light, CIE-C illuminant and a CIE standard observer. The instrument is calibrated with a standard black tile having an assigned a gloss value of 100 gloss units. To perform the measurement, powder was placed in the measuring cup, its surface levelled and then the glossmeter fitted, ensuring tight fitting to exclude room lighting. This procedure was repeated 6 times for each sample.

Results of L*a*b* values, distance from gold and gloss are shown below

TABLE 1

| Sample | L* | a* | b* | ΔE from gold | 60° Gloss units |
|---|---|---|---|---|---|
| A | 55.0 | 8.0 | 25.0 | 70.5 | 0.68 |
| B | 47.8 | 9.1 | 24.5 | 74.6 | 0.62 |
| C | 40.4 | 9.9 | 23.8 | 79.3 | 0.47 |
| Commercial sample i | 31.8 | 11.6 | 19.8 | 88.0 | 0.38 |
| Commercial sample ii | 31.4 | 11.5 | 20.8 | 87.5 | 0.23 |

It can be seen that the samples according to the invention are lighter than the commercial samples, they have a colour closer to gold and they are more glossy.

Figure 5:
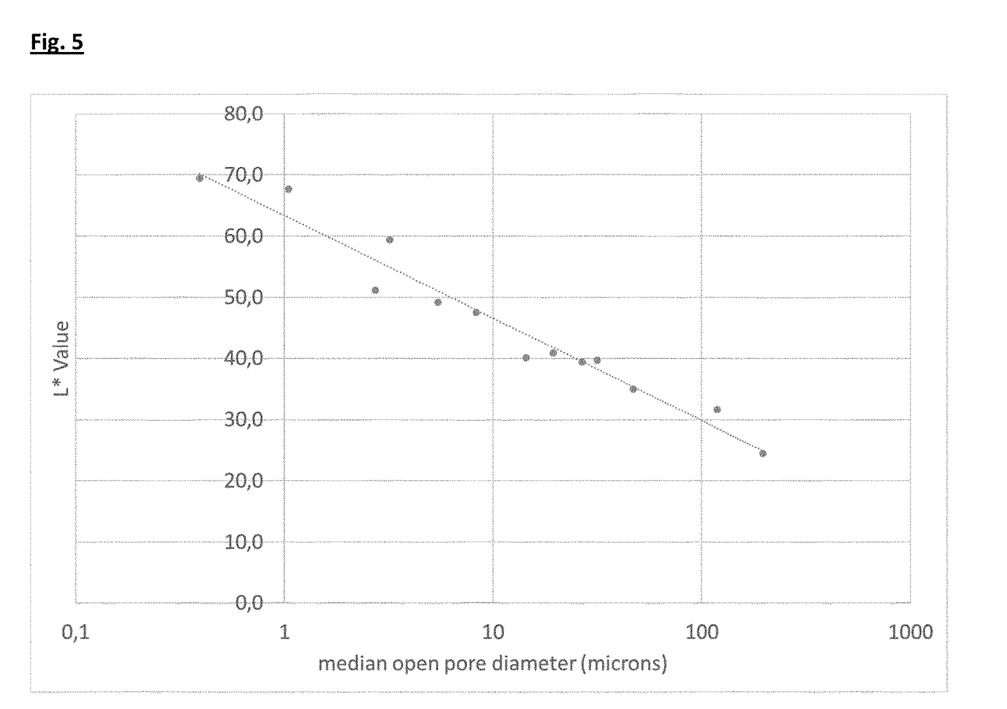
FIG. 5 is a plot of lightness L* measured as described in example 4 (Y-axis) versus median open pore diameter in micrometres (X-axis).

The L* and median pore size of a series of freeze-dried coffee powders, prepared by various methods including that of the invention, were plotted. The results are shown in FIG. 5. It can be seen that the lightness decreases as the median pores size increases.

Various features and embodiments of the present invention will now be described with reference to the following numbered paragraphs (paras).

1. A soluble beverage powder comprising dried coffee extract particles wherein the particles have open pores with openings smaller than 4.5 micrometres, the volume of the open pores with openings smaller than 4.5 micrometres being greater than 50% of the total volume of open pores as measured by mercury porosimetry.
2. The soluble beverage powder according to para 1 wherein the particles have open pores with openings smaller than 2 micrometres, the volume of the open pores with openings smaller than 2 micrometres being greater than 20% of the total volume of open pores as measured by mercury porosimetry.
3. The soluble beverage powder according to any one of paras 1 or 2 wherein the particles have a median open pore diameter of less than 4.5 micrometres as measured by mercury porosimetry.

4. The soluble beverage powder according to any one of paras 1 to 3 having a gloss at 60° geometry of at least 0.25 gloss units.
5. The soluble beverage powder according to any one of paras 1 to 4 having a colour difference ΔE from gold below 80.
6. The soluble beverage powder according to any one of paras 1 to 5 wherein the particles are bi-colour.
7 The soluble beverage powder according to any one of paras 1 to 6 comprising dried coffee extract particles having two essentially flat surfaces and a uniform thickness; wherein the particles have a median thickness from 0.1 to 10 mm, a surface roughness measured by profilometry of less than 12 µm (for example less than 10 µm, for example less than 8 µm, for further example less than 6 µm) and a uniformity index measured by profilometry of greater than 0.6 (for example greater than 0.7.
8. A process for making the soluble beverage powder of any one of paras 1 to 7, the process comprising the steps;
  a. providing a liquid coffee extract (1) having a total solids content between 5 and 65% (for example between 20 and 55%, for example between 30 and 50%);
  b. forming a layer of the coffee extract (2) in contact with a flat surface (3), the coffee extract layer having a thickness from 0.1 to 10 mm (for example between 0.2 and 2.5, 0.3 and 2.0, 0.5 and 1.5 mm);
  c. cooling the coffee extract layer to below −25° C. (for example below −30° C., below −35° C., below −40° C.) to form a frozen coffee extract; and
  d. drying the frozen coffee extract (for example under vacuum).
9. A process for making the soluble beverage powder of any one of paras 1 to 7, the process comprising the steps;
  a. providing a liquid coffee extract (1) having a total solids content between 5 and 65%;
  b. forming a layer of the coffee extract (2) between and in contact with two parallel flat surfaces (1.3a, 1.3b), the surfaces being separated by a gap of from 0.1 to 10 mm;
  c. cooling the coffee extract layer to below −25° C. to form a frozen coffee extract; and
  d. drying the frozen coffee extract.
10. The process of para 9 wherein the flat surfaces are moving bands (6a, 6b).
11. The process of para 10 wherein cooling (4a, 4b) is applied to at least one moving band.
12. The process of para 11 wherein greater cooling is applied to one moving band than the other.
13. The process of any one of paras 9 to 12 wherein the bands pass through multiple cooling zones.
14. The process of any one of paras 9 to 13 wherein the belts are oriented vertically and the liquid coffee extract is fed between the belts at the top, travels downwards in contact with the moving belts forming frozen coffee extract which is discharged (8) from the bottom.

The invention claimed is:

1. A soluble beverage powder comprising dried coffee extract particles wherein the particles have open pores with openings smaller than 4.5 micrometres, the volume of the open pores with openings smaller than 4.5 micrometres being greater than 50% of the total volume of open pores as measured by mercury porosimetry.

2. The soluble beverage powder according to claim 1 wherein the particles have open pores with openings smaller than 2 micrometres, the volume of the open pores with openings smaller than 2 micrometres being greater than 20% of the total volume of open pores as measured by mercury porosimetry.

3. The soluble beverage powder according to claim 1 wherein the particles have a median open pore diameter of less than 4.5 micrometres as measured by mercury porosimetry.

4. The soluble beverage powder according to claim 1 having a gloss at 60° geometry of at least 0.25 gloss units.

5. The soluble beverage powder according to claim 1 having a colour difference ΔE from gold below 80.

6. The soluble beverage powder according to claim 1 wherein the particles are bi-colour.

7. The soluble beverage powder according to claim 1 comprising dried coffee extract particles having two essentially flat surfaces and a uniform thickness; wherein the particles have a median thickness from 0.1 to 10 mm, a surface roughness measured by profilometry of less than 12 µm and a uniformity index measured by profilometry of greater than 0.6.

* * * * *